United States Patent Office 3,120,598
Patented Feb. 4, 1964

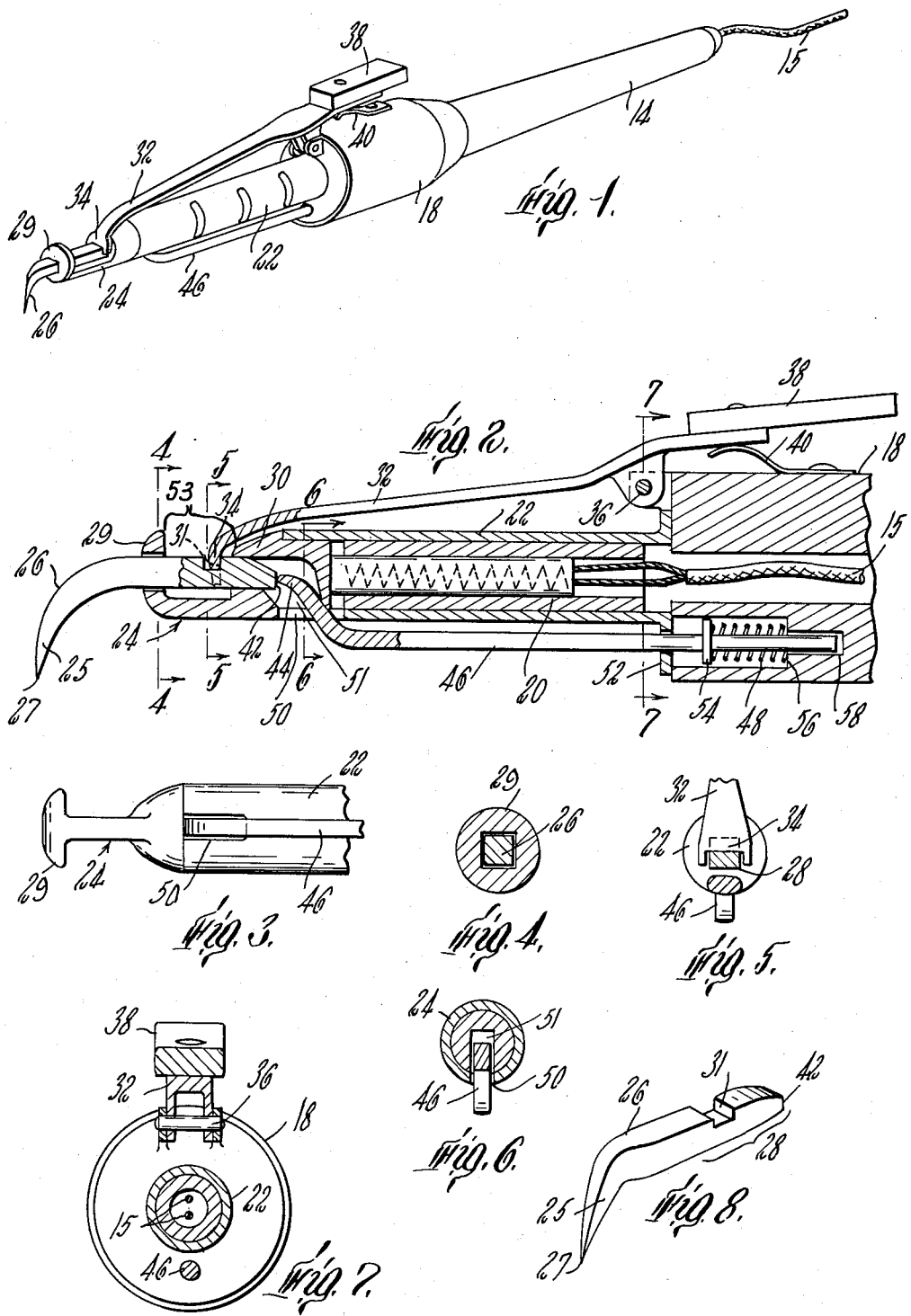

3,120,598
DEVICE FOR SHAPING HEAT SOFTENABLE MATERIALS
Paul M. Westerback, Worcester, Mass., and Louis Siegel, 43 Gardner Road, Brookline, Mass.; said Westerback assignor to said Siegel
Filed Apr. 27, 1961, Ser. No. 106,092
2 Claims. (Cl. 219—21)

This invention relates to devices for shaping heat softenable material and particularly to a time-saving device for shaping wax in making dental restorations and appliances.

Numerous steps are involved in making dental restorations. First, impressions are taken of the mouth with any of various materials known to the art. Second, a mold is formed from this impression. Third, a wax "try in" pattern is formed on the mold to conform to the part of the mouth being restored. Fourth, the dentist seats the pattern in the mouth and makes such adjustments as are necessary for appearance and comfort. Fifth, from the pattern, a mold is formed and the dental restoration is cast in the mold from material such as plastic, gold, chrome or ceramics. Metal clasps sometimes are provided to secure restorations to natural teeth.

As an example of the numerous instances of shaping heat softenable materials, the third step of forming the pattern in making a denture comprises building wax up on the mold in the desired form to fit and to receive the individual false teeth. For this, strips of softened wax are adapted to the mold and a heated spatula is passed over the wax to conform it to the contour of the mouth. With a hot spatula adapted to convey wax, additional wax is taken from a supply and applied to build up the wax mass and seal it into a self-supporting form.

A number of differently shaped steel spatulas can be used in these wax shaping steps. Each is heated repeatedly over a Bunsen burner as the forming operation progresses. This technique has numerous drawbacks including frequent interruption of the shaping process while the tool is reheated with consequent loss of time, with distracting tool movement back and forth between burner and work. Similar techniques are employed by the laboratory in making partials, inlays and bridge work and by the dentist in preparing wax for a bite block impression and in making adjustments of wax try ins.

While it has been realized in the past that electrically heated devices with interchangeable tool heads would offer considerable advantages to the dental profession, none have been suggested which permit sure and rapid interchange while being economical to manufacture. In particular, most devices heretofore suggested have employed screw threads in one form or another to secure the tool head to the device. We have realized that the manipulation of such releases results in needless loss of time. Also, we have realized that pumice for polishing and chrome, plastic and plaster dusts, products of the numerous grinding operations employed in the laboratory, are inevitably present, and these substances tend to enter threaded parts preventing operation and requiring frequent cleaning. Furthermore, such devices are expensive to manufacture, requiring numerous fitted parts machined to close tolerances.

Numerous suggested devices have required the operator to either grasp the tool head when hot to effect interchange, or require cooling of the device before interchange. Some of such devices are subject to jamming with wax when cold, and so require an initial heating for tool change.

No electrically heated tool has been suggested which is not objectionable for these or other reasons. Consequently, the Bunsen burner heated spatula is to this day widely used by the dental profession.

It is a principal objective of this invention to provide an improved electrically heated tool for shaping wax and similar heat softenable materials which avoids or overcomes these problems.

A particular objective is to provide an economical and dependable electrically heated tool for waxing in which tool heads can be reliably and rapidly interchanged while the heating device is hot without risk of the operator being burned in removing the tool head being replaced and which does not require the manipulation of threaded parts.

Another objective is to provide improved tool heads for quick interchange.

These and other objectives are realized with the apparatus described hereafter.

In the drawings:
FIG. 1 is a perspective of an embodiment of the device of the invention;
FIG. 2 is a sectional side view of the device of FIG. 1;
FIG. 3 is a view looking up at the bottom of the head portion of the device as shown in FIG. 2;
FIGS. 4, 5, 6 and 7 are sectional views taken on lines 4—4, 5—5, 6—6 and 7—7 of FIG. 2 respectively;
FIG. 8 is a perspective view of a tool head separated from the device.

Features of the invention are a heat conductive tool head having a shank slidably inserted in a shank support passage, disposed adjacent an electric heater, a resilient member isolated from heated portions of the device, a thrust transmitting means having a heat resistant portion engaged with the tool head shank, adapted to transmit forces from the resilient member to urge the tool head outwardly, and a releasable catch means including a heat resistant detent engaged with a special notch surface on the tool head adapted to restrain the tool head from outward movement. A number of tool heads are specially adapted for desired operations, each being formed of material having a heat conductance cooperatingly proportioned to the heating capacity of the heater, to hold the working surface of the tool head at the temperature level desired for its operation.

Referring to the drawings, the illustrated embodiment includes a heat insulated handle 14 providing a hand gripping surface and through which electric wires 15 pass, a guard 18, an electrical resistance heater unit 20 connected to the wires, a tubular handle extension member 22 of heat resistant material extending forwardly from the guard over the heat unit, and a rigid tool support member 24 of heat conductive metal telescopically fitted to the end of the handle extension member 22, having its inner end in heat conductive relation to the heater, and being formed to define an open passage to receive a tool shank. As seen in FIG. 8, a heat conductive tool head 26 has a working surface 25, a point 27 and a shank 28 adapted to be slidably inserted in the passage of support member 24. This particular tool is for the special time-saving operations of separating metal retentive clasps from plastic and removing teeth from dental restorations for replacement. Interchangeable tool heads (not shown) having many differently shaped working surfaces are intended for use with the device.

Intermediate the inner and outer ends 29, 30 of the passage of support member 24 is a side opening 53 which exposes a portion of the shank of the tool head when it is slidably inserted in the passage. The shank portion thus exposed is provided with an outwardly directed notch surface 31 which is engaged by a releasable catch mechanism including a heat resistant metal arm 32, preferably of stainless steel, having a detent portion 34 engaged upon notch surface 31.

Arm 32 extends rearwardly from the heated tool head to guard 18 to which it is mounted for pivotal movement about pivot 36. Lever 38 extending in the opposite direction is connected to arm 32 in a bell crank arrangement. Detent 34 is released from the notch by exerting pressure upon lever 38 to overcome the resistance of leaf spring 40, the latter being mounted on guard 18 to urge the lever 38 away and arm 32 towards the main body of the device.

An inwardly directed tool head shank surface 42 is adapted to be engaged by the end 44 of a rigid heat resistant push rod 46, also preferably of stainless steel, for transmittal of an outwardly directed longitudinal force from spring member 48. For this purpose an opening is defined by a slot 50 in handle extension member 22 and a corresponding slot 51 in the support member into which the push rod end 46 extends to the tool head shank surface 42.

The push rod portion extending inwardly from the heated tool head passes through a guide member 52 into a chamber isolated from the heater. A disc 54 mounted on the push rod engages one end of compressive spring member 48, and the opposite spring end is engaged on rigid wall 56. The push rod extends through the spring to passage 58 in which it is slidingly engaged for alignment.

A cold tool head is secured to the device by pushing its shank into the passage of support member 24. The shank surface 42 engages push rod end 44, and the operator must exert some force to overcome the outward force of the spring 48 in pushing the shank inwardly to position the notch surface 31 for restaint. Detent 34 extending through the opening slides on the longitudinal surface of the shank until it registers with the notch. When that occurs, the force of leaf spring 40 causes the arm 32 to pivot towards the body of the device, the detent engages the notch surface 31 and locks the tool head from outward movement in a heat receiving relation to the heater. Thus the tool head is supported and heated, ready for use.

When it is desired to change to a different tool head, the device is placed over a suitable surface and lever 38 is pressed downwardly. This releases detent 34 from notch 31 in the tool head shank, and the outward force resiliently exerted by push rod end 46 from spring 48 ejects the hot tool head, and another tool head can then be quickly inserted.

It will be seen that the actuating springs employed are isolated from the heated portions of the device so they do not lose their temper while the tool heads are releasably secured in direct heat transferring relation to the heater. Advantageously, as shown in the embodiment of the drawings, the heat resistant detent carrying arm and the push rod span the heater, permitting location of the springs rearwardly thereof near the hand grip portions, which achieves insulated isolation most economically. Also, as shown in the drawings, the support member providing the passage in which the tool shank is seated is of heat conductive material such as copper, achieving efficient heating of the tool head.

The heat conductive character of the tool head is proportioned to the heating ability of the device so that the steady heat transfer state obtained during energization of the heater maintains the working surfaces of the tool head at the temperature needed for that operation for which the tool head is adapted. Conveniently for a very hot working surface the tool head can be made of copper, while for lower temperatures selected bronzes, brasses and aluminum or combinations of these with other materials can be employed.

In addition to forming wax, tool heads secured in the device can be employed to perform various operations on dentures formed of thermoplastic material, such as scoring grooves in them for insertion of clasp wires, and then sealing the wires in place.

The foregoing is presented for the purpose of illustration. Various of the specific details can be changed within the spirit and scope of the invention.

What is claimed is:

1. The device for shaping heat softenable material comprising an elongated handle having a hand gripping portion, a forward rigid supporting member having a shank support passage adapted to support and position the shank of a conductive tool head in a heat transferring relation to an electric heater located within said supporting member and insulated from said gripping portion, a releasable catch means adapted to engage said tool head and secure it in said passage, and an outward thrust means comprising a resilient element and a heat resistant thrust transmitting element engaged with said resilient element, wherein said resilient element is spaced radially from the central axis of said device and rearwardly from said heater and said thrust transmitting element extends externally of said supporting member and parallel to it and radially spaced therefrom, said thrust transmitting element having a tool head contacting portion at its forward end extending into said shank support passage through a slot in the wall of said passage to engage with force an inwardly directed surface of said tool head when said tool head is so inserted in said passage that said catch means is engaged therewith, said thrust transmitting element thereby adapted to firmly position said tool head in said device as well as to eject said tool head when hot from said device when said catch means is released.

2. The device for shaping heat softenable material comprising an elongated handle having a hand gripping portion extending forwardly to a raised portion, beyond said raised portion a forward rigid supporting member having a shank support passage adapted to support and position the shank of a conductive tool head in a heat transferring relation to an electric heater located within said supporting member and insulated from said gripping portion, a releasable catch means adapted to engage said tool head and secure it in said passage, and an outward thrust means comprising a resilient element and a heat resistant thrust transmitting element engaged with said resilient element, wherein said resilient element is housed in said raised portion and spaced radially from the central axis of said device, and said thrust transmitting element extends externally of said supporting member and parallel to it and radially spaced therefrom, said thrust transmitting element having a tool head contacting portion at its forward end extending into said shank support passage through a slot in the wall of said passage to engage with force an inwardly directed surface of said tool head when said tool head is so inserted in said passage that said catch means is engaged therewith, said thrust transmitting element thereby adapted to firmly position said tool head in said device as well as to eject said tool head when hot from said device when said catch means is released.

References Cited in the file of this patent

UNITED STATES PATENTS

| 949,439 | Rhyne | Feb. 15, 1910 |
| 1,154,414 | Kuhn et al. | Sept. 21, 1915 |
| 1,697,962 | Meyer | Jan. 8, 1929 |
| 1,904,051 | Jones | Apr. 18, 1933 |
| 2,350,565 | Mills | June 6, 1944 |
| 2,429,888 | Moore | Oct. 28, 1947 |
| 2,594,878 | Davis | Apr. 28, 1952 |

FOREIGN PATENTS

| 364,668 | Germany | Nov. 30, 1922 |
| 428,851 | Italy | Jan. 8, 1948 |